United States Patent [19]

Conroy

[11] 4,311,763

[45] Jan. 19, 1982

[54] SILICONE RESIN COATING COMPOSITION

[75] Inventor: James T. Conroy, Green Island, N.Y.

[73] Assignee: General Electric Company, Waterford, N.Y.

[21] Appl. No.: 170,994

[22] Filed: Jul. 18, 1980

[51] Int. Cl.$^3$ .......................... B32B 9/04; B32B 13/12
[52] U.S. Cl. .................................. 428/412; 428/460; 428/457; 428/500; 428/451; 428/447; 260/29.2 M; 260/27 SB; 528/10; 528/43; 528/18
[58] Field of Search .................. 260/29.2 M; 428/412, 428/500, 457, 447, 451, 460, 164

[56] References Cited

U.S. PATENT DOCUMENTS

| | | | |
|---|---|---|---|
| 3,629,165 | 12/1971 | Holdstock | 260/2.5 AH |
| 3,708,225 | 1/1973 | Misch et al | 351/160 |
| 3,976,497 | 8/1976 | Clark | 106/287 SE |
| 3,986,997 | 10/1976 | Clark | 260/29.2 M |
| 4,177,315 | 12/1979 | Udersax | 428/336 |

*Primary Examiner*—Marion McCamish
*Assistant Examiner*—Beverly K. Johnson
*Attorney, Agent, or Firm*—Hedman, Casella, Gibson & Costigan

[57] ABSTRACT

An improved silicone resin coating composition is provided, the composition comprising an aged dispersion of colloidal silica in an aliphatic alcohol-water solution of the partial condensate of a silanol with a small, adhesion-promoting amount of a $\beta$-hydroxyketone compound added thereto.

23 Claims, No Drawings

SILICONE RESIN COATING COMPOSITION

BACKGROUND OF THE INVENTION

This invention relates to an improved protective coating composition. More particularly, it relates to a silicone resin coating composition which, when applied to a substrate, forms a protective abrasion-resistant coating thereon.

Recently, the substitution of glass glazing with transparent materials which do not shatter or are more resistant to shattering than glass, has become widespread. For example, transparent glazing made from synthetic organic polymers is not utilized in public transportation vehicles, such as brains, buses, taxis and airplanes. Lenses, such as for eyeglasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering than glass, a serious drawback lies in the ease with which these plastics mar and scratch, due to everyday contact with abrasives, such as dust, cleaning equipment and ordinary weathering. Continuous scratching and marring results in impaired visibility and poor aesthetics, and oftentimes requires placement of the glazing or lens or the like.

One of the most promising and widely used transparent plastics for glazing is polycarbonate, such as that known as Lexan ®, sold by General Electric Company. It is a tough material, having high impact strength, high heat deflection temperature, good dimensional stability, as well as being self-extinguishing, and is easily fabricated.

Attempts have been made to improve the abrasion resistance of transparent plastics. For example, scratch-resistant coatings formed from mixtures of silica, such as colloidal silica or silica gel, and hydrolyzable silanes in a hydrolysis medium, such as alcohol and water, are known. U.S. Pat. Nos. 3,708,225, 3,986,997, 3,976,497 and 4,177,315, for example, describe such compositions.

Copending U.S. application entitled "Silicone Resin Coating Compositions," by Howard A. Vaughn, Ser. No. 964,910, filed Nov. 30, 1978, discloses another abrasion-resistant coating composition. Copending Frye application, Ser. No. 964,911, filed Nov. 30, 1978, describes the use of small amounts of polysiloxane polyether copolymers to promote coating formation. Copending Frye application, Ser. No. 91,716, filed Nov. 6, 1978, describes the use of small amounts of ultraviolet screens to improve adhesion on weathering. Such coating compositions have been found to be highly desirable as a protective finish for plastic, as well as metal or metallized substrates. A particularly significant area of application for those improved coatings is in the glazing and optical lens industry. All such coatings generally require a thermal cure for about one hour at 120° C. to achieve acceptable abrasion resistance. It would be desirable to lower this cure temperature, while retaining adequate adhesion. It has now been surprisingly discovered herein that the addition of small amount of a $\beta$-hydroxyketone compound to the coating compositions disclosed in the aforementioned patents and especially those of the applications eliminates the need to cure at such high temperatures, while retaining adhesion properties as well as providing other improvements in the hard coating which will be discussed in detail hereinafter. The patents and applications are incorporated herein by reference.

SUMMARY OF THE INVENTION

Accordingly, it is one object of the present invention to provide an improved adherent silicone resin coating composition for solid substrates.

Another object of this invention is to provide a silicone resin coating composition for solid substrates which, when applied, provides an adherent, abrasion resistant surface thereto.

Still another object of this invention is to provide a silicone resin coating composition which is adherent and especially well suited for transparent plastics.

A further object of this invention is to provide a silicone resin coating composition which is adherent, and when applied to a transparent plastic, does not impair the optical clarity thereof.

A still further object of this invention is to provide a silicone resin coating composition which, when applied to a solid substrate, not only provides an abrasion resistant coating thereto but also provides an adherent coating with increased resistance to stress cracking.

These and other objects are accomplished herein by an improved coating composition comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, said composition containing 10 to 50 weight percent solids, said solids consisting essentially of 10 to 70 weight percent colloidal silica and 30 to 90 weight percent of the partial condensate, especially such compositions having a pH of from 7.1 to about 7.8, the improvement comprising the intimate admixture of a small, adhesion-promoting amount of a $\beta$-hydroxyketone compound with an aged such composition.

DETAILED DESCRIPTION OF THE INVENTION

The coating compositions of this invention are prepared by hydrolyzing an alkyltrialkoxysilane or aryltrialkoxysilane of the formula $RSi(OR)_3$, wherein R is alkyl of from 1 to 3 carbons or aryl, such as phenyl, in an aqueous dispersion of colloidal silica, aging them, e.g., for at least about 5 days at a temperature of at least about 18° C. and then admixing a $\beta$-hydroxyketone compound with the resultant reaction product.

In the practice of the present invention, suitable aqueous colloidal silica dispersions generally have a particle size of from 5 to 150 millimicrons in diameter. These silica dispersions are well known in the art and commercially available ones include, for example, those sold under the trademarks of Ludox (duPont) and Nalcoag (NALCO Chemical Co.). Such colloidal silicas are available as both acidic and basic hydrosols. For the purposes of this invention, wherein the pH of the coating compositions is on the basic side, basic colloidal silica sols are preferred. However, acidic colloidal silicas, wherein the pH is adjusted to a basic level, are also contemplated. In addition, it has been found that colloidal silicas having a low alkali content (e.g., $Na_2O$) yield a more stable coating composition. Thus, colloidal silica having an alkali content of less than 0.35% (calculated as Na₂O) are preferred. Moreover, colloidal silicas having average particle size of from 10 to 30 millimicrons are also preferred. A particularly preferred one for the purposes herein is known as Ludox LS, sold by duPont Company.

In accordance with this invention, the aqueous colloidal silica dispersion is added to a solution of a small amount of alkyltriacetoxysilane in alkyltrialkoxysilane or aryltrialkoxysilane. The temperature of the reaction mixture is maintained at about 20° C. to about 40° C. and preferably below 25° C. It has been found that in about six to eight hours sufficient trialkoxysilane has reacted to reduce the initial two-phase liquid mixture to one liquid phase in which the now treated silica (i.e., treated by admixture with the trialkoxysilane) is dispersed. In general, the hydrolysis reaction is allowed to continue for a total of about 24 hours to 48 hours, depending upon the desired viscosity of the final product. The more time the hydrolysis reaction is permitted to continue, the higher will be the viscosity of the product. After hydrolysis has been completed, the solids content is adjusted by the addition of alcohol, preferably isobutanol, to the reaction mixture. Other suitable alcohols for this purpose include lower aliphatic alcohols such as methanol, ethanol, propanol, isopropanol, n-butyl alcohol and t-butyl alcohol. Mixtures of such alcohols can be used, too. The solvent system should contain from about 20 to 75 weight percent alcohol to ensure solubility of the partial condensate (siloxanol). Optionally, additional water-miscible polar solvents, such as acetone, butylcellosolve and the like in minor amounts, like no more than 20 weight percent of the cosolvent system, can also be employed. The solids content of the coating composition of this invention is generally preferred to be in the range of from about 18 to 25%, more preferably about 20%, by weight of the total composition. The pH of the resultant coating composition is in the range of from about 3 to about 8, preferably from about 7.8, and especially preferably around about 7.2. If necessary, dilute base, such as ammonium hydroxide, or weak acid, such as acetic acid, may be added to the composition to adjust the final pH to this desired range.

It has been found herein that it is advantageous to include a β-hydroxyketone compound in the coating composition. This β-hydroxyketone compound should be added to the composition after the hydrolysis reaction is complete and preferably after aging for at least 5 days at about 18°–25° C. Without aging there is a tendency for initial cracking. The β-hydroxyketone compound acts as an adhesion promoter and lowers the temperature at which the coating can be cured, e.g., from 120° C. to 80°, 85° or 90° C. For the purposes of this invention, the β-hydroxyketone compound is employed is an amount of from about 2.5 to about 15% by weight of the composition. Most advantageous results are achieved when the compound is utilized at about 5 to 10% by weight of the composition. In compositions containing polysiloxane polyether copolymer tests have shown that the higher amounts are more desirable at lower temperatures. In any case, there are salutary effects on abrasion resistance, scribed adhesion, ultraviolet light resistance, moisture and humidity resistance of the coating.

More specially, some of the β-hydroxyketone compounds useful in the practice of the invention herein are those having the formula:

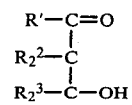

wherein R¹ is a monovalent hydrocarbon radical of from 1 to 18 carbon atoms and R² and R³ are, independently, a monovalent hydrocarbon radical of from 1 to 18 carbon atoms or hydrogen.

Among the hydrocarbon radicals represented by R¹, R² and R³ are in the above formula can be mentioned, for example, alkyl radicals, e.g., methyl, ethyl, propyl, butyl, octyl, etc.; cyloalkyl radicals, e.g., cyclohexyl, cycloheptyl, etc.; aryl radicals, e.g., phenyl, tolyl, naphthyl, xylyl, etc.; aralkyl, e.g., benzyl phenylethyl, etc., alkenyl and cycloalkenyl, e.g., vinyl, allyl, cyclohexenyl, etc.; and halogenated radicals of the aforementioned type, e.g., chloromethyl, chlorophenyl, dibromophenyl, etc. In the above formula R¹ is preferably methyl, R² each are preferably methyl, and R³ each are preferably butyl. The preferred compound is also known as diacetone alcohol, which is commercially available. Other suitable compounds of the above formula can easily be made by those skilled in this art.

In certain embodiments, polysiloxane polyether copolymers will also be present. These are described in U.S. Pat. No. 3,629,165, incorporated herein by reference, and also include the materials known as SF-1066 and SF-1141, both sold by General Electric Company, BYK-300, sold by Mallinckrodt, L-540, sold by Union Carbide, and DC-190, sold by Dow Corning.

The alkyltriacetoxysilane is used to buffer the basicity of the initial two liquid phase reaction mixture and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic, and the like. Alkyltriacetoxysilanes wherein the alkyl group contains from 1–6 carbon atoms can be used, alkyl groups having from 1 to 3 carbon atoms being preferred. Methyltriacetoxysilane is most preferred.

The silanetriols, RSi(OH)₃, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which upon hydrolysis generate the silanetriols and further liberate the corresponding alcohol. In this way, at least a portion of the alcohol content present in the final coating composition is provided. Upon the generation of the hydroxyl substituents to form

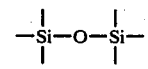

bonding occurs. This condensation takes place over a period of time and is not exhaustive but rather the siloxane retains an appreciable quantity of silicon-bonded hydroxyl groups which render the polymer soluble in the alcohol-water cosolvent. This soluble partial condensate can be characterized as a siloxanol polymer having at least one silicon-bonded hydroxyl group per every three

units.

The non-volatile solids portion of the coating composition herein is a mixture of colloidal silica and the partial condensate (or siloxanol) of a silanol. The major portion or all of the partial condensate or siloxanol is obtained from the condensation of $CH_3Si(OH)_3$ and, depending upon the input of ingredients to the hydrolysis reaction, minor portions of partial condensate can be obtained, for example, from the condensation of $CH_3Si(OH)_3$ with $C_2H_5Si(OH)_3$ or $C_3H_7Si(OH)_3$; $CH_3Si(OH)_3$ with $C_6H_5Si(OH)_3$, or even mixtures of the foregoing. For optimum results in the cured coating it is preferred to use all methyltrimethoxysilane (thus generating all monomethylsilanetriol) in preparing the coating compositions herein. In the preferred coating compositions herein the partial condensate is present in an amount of from about 55 to 75 weight percent of the total solids in a cosolvent of alcohol and water, the alcohol comprising from about 50% to 95% by weight of the cosolvent.

The coating compositions of this invention will cure on a substrate at temperatures of, for example, 120° C. without the aid of an added curing catalyst. However, in order to employ more desirable milder curing conditions, buffered latent condensation catalysts will preferably be added. Included in this class of catalysts are alkali metal salts of carboxylic acids, such as sodium acetate, potassium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base and alkali metal carboxylate catalysts will be generated in situ during the hydrolysis reaction herein.

The amount of curing catalysts can be varied within a wide range, depending upon the desired curing conditions. However, in general, catalyst in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 75°-150° C. to provide a transparent abrasion resistant surface coating.

The coating compositions of the present invention can be applied to a variety of solid substrates by conventional methods, such as flowing or dipping, to form a continuous surface film. Substrates which are especially contemplated herein are transparent and nontransparent plastics and metals. More particularly, these plastics are synthetic organic polymeric substrates such as acrylic polymers, like poly(methylmethacrylate), polyesters, such as poly(ethylene terephthalate), poly(butylene terephthalate), etc., polyamides, polyimides, acrylonitrile-styrene copolymers, styrene-acrylonitrilebutadiene copolymers, polyvinyl chloride, butyrates, polyethylene and the like. As noted above, the coating compositions of this invention are especially useful as coatings for polycarbonates, such as those polycarbonates known as Lexan ®, sold by General Electric Company. The metal substrates on which the present protective coatings are utilized include bright and dull metals like aluminum and bright metallized surfaces like sputtered chromium alloy. Other solid substrates contemplated herein include wood, painted surfaces, leather, glass, ceramics and textiles.

By choice of the proper formulation, application conditions and pretreatment, including the use of primers, of the substrate, the coatings can be adhered to substantially all solid substrates. A hard coating having all of the afore-mentioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsesquioxane ($RSiO_{3/2}$). In the finished cured coating the ratio of $RSiO_{3/2}$ units to $SiO_2$ will range from about 0.43 to about 9.0, preferably 1 to 3. A cured coating having a ratio of $RSiO_{3/2}$ to $SiO_2$, when R is methyl, of 2 is more preferred. The coating thickness can be varied by means of the particular application technique, but coatings of about 0.5 to 20 microns, preferably 2-10 micron thickness are generally utilized.

In order that those skilled in the art may better understand how to practice the present invention, the following examples are given by way of illustration and not by way of limitation.

Procedure A

Twenty-two and one-tenth parts by weight of Ludox LS, silica sol (aqueous dispersion of colloidal silica, average particle size is 12 millimicrons, pH of 8.2 sold by duPont) is added to a solution of 0.1 parts by weight of methyltriacetoxysilane in 26.8 parts by weight of methyltrimethoxysilane. The temperature of the reaction mixture is maintained at 20° C. to 30° C., preferably below 25° C. The hydrolysis is allowed to continue for 24 hours. The solids content of the resultant reaction mixture is 40.5% and is diluted to about 20% solids with the addition of isobutanol. To 99.0 grams of the composition, one gram (5% of solids) of SF-1066 (polysiloxane polyether copolymer) sold by GE is added, and the resulting composition is thoroughly mixed. It has a pH of higher than 7.2.

Procedure B

Twenty-two and one-tenth parts by weight of Ludox LS, silica sol (aqueous dispersion of colloidal silica, average particle size is 12 millicrons, pH of 8.2 sold by duPont) is added to a solution of 0.1 parts by weight of methyltriacetoxysilane in 26.8 parts by weight of methyltrimethoxysilane. The temperature of the reaction mixture is maintained at 20° C. to 30° C., preferably below 25° C. The hydrolysis is allowed to continue for 24 hours. The solids content of the resultant reaction mixture is 40.5% and is diluted to about 20% solids with the addition of isobutanol. One gram (5% of solids) of silicone polyether flow control agent (SF-1066, General Electric) is added. The resulting resin is allowed to age at room temperature for at least 48 hours before 2,4-dihydroxybenzophenone (2,4-DHBP; Uvinul 400, GAF Corp.) is added to portions of the resin at 5% by weight of solids. After stirring to dissolve the compound, the product is again allowed to age for at least 72 hours.

Procedure C

Coating compositions are flow-coated onto a 6" by 8"×⅛" transparent Lexan ® (poly(bisphenol-A carbonate)) panel primed with a 4% thermoplastic acrylic solution. After air drying for 30 minutes, the panel is cured for specified times at specified temperatures. The resultant hard coatings are observed for smoothness, clarity and evidence of flowmarks or stress cracking. After 500 Taber Abraser cycles (500 g load, CS-10F wheels) ANSI-Z26.1-1977 section 5.17) the change in percent haze (Δ%H) is determined in a Gardner Haze Meter and reported. Adhesion is measured by cross-batch tape adhesion, withstanding 3 pulls being denoted "pass;" adhesion is determined initially, and after being removed following the stated periods, from a water bath at 65° C.

EXAMPLES 1–4

Eight polycarbonate panels are primed with a 4% thermoplastic acrylic solution, and air-dried for ½ hour. The panels are top coated with coatings comprising those made in accordance with Procedures A and B, and aged for five to fourteen days. To some are added the β-hydroxyketone compound diacetone alcohol, and to others the latent curing catalyst potassium acetate and to still others, both. The top coated panels are then air dried for another ½ hour and cured according to the specified conditions. Adhesion and abrasion results are determined by Procedure C and the compositions and the results obtained are set forth in Table 1.

TABLE 1

| | Silicone Hard Coats Containing β-Hydroxyketone Compound | | | | | | | |
|---|---|---|---|---|---|---|---|---|
| Example | 1A* | 1B* | 1C* | 1D* | 1 | 2 | 3 | 4 |
| Composition (parts by weight) | | | | | | | | |
| Procedure A | 100 | 100 | — | — | 100 | — | 100 | — |
| Procedure B | — | — | 100 | 100 | — | 100 | — | 100 |
| Potassium Acetate | — | — | — | — | — | — | .2$^a$ | .2$^a$ |
| Diacetone Alcohol | — | — | — | — | 9$^b$ | 9$^b$ | 9 | 9 |
| Conditions of Cure | | | | | | | | |
| Temp., °C. | 82 | 120 | 82 | 120 | 82 | 82 | 82 | 82 |
| Time, min. | 70 | 60 | 70 | 60 | 70 | 70 | 70 | 70 |
| Properties | | | | | | | | |
| Initial Scribed Adhesion Test | Fail | Pass | Fail | Pass | Pass | Pass | Pass | Pass |
| Taber Abrasion | | | | | | | | |
| Initial Haze | N.D.** | 0.5 | N.D. | 0.5 | 0.4 | 0.6 | 0.4 | 0.5 |
| % Haze (500) | N.D. | 1.4 | N.D. | 2.6 | 4.8 | 12.3 | 3.6 | 6.2 |

*Control
**N.D. - not determined
$^a$added as 10 parts of 2.0% KOAC in 9:1 diacetone alcohol-methanol
$^b$added as 9 parts of diacetone alcohol.

The results clearly demonstrate that the addition of the β-hydroxycarbonyl compound gives acceptable initial adhesion when cured as low as 82° C.—for one hour. In addition, the latent catalysts (KOAC) is not affected.

EXAMPLES 5–17

To establish the preferred minimum amounts of β-hydroxyketone compound, twenty-eight polycarbonate panels are primed with a 4% thermoplastic acrylic solution, and air-dried for ½ hour. The panels are top coated with coatings comprising those made in accordance with Procedures A and B, to some of which are also added the β-hydroxyketone compound diacetone alcohol, in specified amounts. The top coated panels are then air-dried for another ½ hour and cured according to the specified conditions. Adhesion results are determined by Procedure C and the results obtained are set forth in Table 2:

TABLE 2

| Silicone Hard Coats Containing β-Hydroxyketone Compound As Adhesion Promoter | | | | | | | | | | | | |
|---|---|---|---|---|---|---|---|---|---|---|---|---|
| Example | 5a* | 5B* | 5C* | 5D* | 5E* | 5F* | 5 | 6 | 7 | 7A* | 7B* | 8 |
| Composition (parts by weight) | | | | | | | | | | | | |
| Procedure A (w/o uv screen) | 100 | 100 | 100 | — | — | — | 100 | 100 | 100 | 100 | 100 | 100 |
| Procedure B (w/uv screen) | — | — | — | 100 | 100 | 100 | — | — | — | — | — | — |
| Diacetone Alcohol | — | — | — | — | — | — | 5 | 5 | 6 | 7 | 8 | 9 |
| Conditions of Cure | | | | | | | | | | | | |
| Temp., °C. | 90 | 85 | 80 | 90 | 85 | 80 | 90 | 85 | 85 | 85 | 85 | 85 |
| Time, min. | 60 | 60 | 60 | 60 | 60 | 60 | 60 | 60 | 60 | 60 | 60 | 60 |
| Properties | | | | | | | | | | | | |
| Initial Scribed Adhesion Test | Fail | Fail | Fail | Fail | Fail | Fail | Pass | Fail | Fail | Fail | Fail | Pass |

| Example | 9 | 9A* | 9B* | 9C* | 9D* | 9E* | 10 | 11 |
|---|---|---|---|---|---|---|---|---|
| Composition (parts by weight) | | | | | | | | |
| Procedure A (w/o uv screen) | 100 | 100 | 100 | 100 | 100 | 100 | 100 | — |

TABLE 2-continued

Silicone Hard Coats Containing β-Hydroxyketone Compound As Adhesion Promoter

| | | | | | | | | |
|---|---|---|---|---|---|---|---|---|
| Procedure B (w/uv screen) | — | — | — | — | — | — | — | 100 |
| Diacetone Alcohol | 10 | 5 | 6 | 7 | 8 | 9 | 10 | 5 |
| Conditions of Cure | | | | | | | | |
| Temp., °C. | 85 | 80 | 80 | 80 | 80 | 80 | 80 | 85 |
| Time, min. | 60 | 60 | 60 | 60 | 60 | 60 | 60 | 60 |
| Properties | | | | | | | | |
| Initial Scribed Adhesion Test | Pass | Fail | Fail | Fail | Fail | Fail | Pass | Pass |
| Example | 12 | 13 | 13A* | 13B* | 14 | 15 | 16 | 17 |
| Composition (parts by weight) | | | | | | | | |
| Procedure A (w/o uv screen) | — | — | — | — | — | — | — | — |
| Procedure B (w/uv screen) | 100 | 100 | 100 | 100 | 100 | 100 | 100 | 100 |
| Diacetone Alcohol | 7 | 10 | 5 | 6 | 7 | 8 | 9 | 10 |
| Conditions of Cure | | | | | | | | |
| Temp., °C. | 85 | 85 | 80 | 80 | 80 | 80 | 80 | 80 |
| Time, min. | 60 | 60 | 60 | 60 | 60 | 60 | 60 | 60 |
| Properties | | | | | | | | |
| Initial Scribed Adhesion Test | Pass | Pass | Fail | Fail | Pass | Pass | Pass | Pass |

*Control

These results indicate the effective amount of diacetone alcohol necessary to achieve initial scribed adhesion at specific cure temperatures. It is seen that the composition of Procedure B (with uv screen) does not adhere, and the composition of Procedure A (without uv screen) has marginal adhesion, to the primed substrates, when cured at 90° C. for one hour. A proper amount of the β-hydroxyketone compound, diacetone alcohol, alleviates this problem. The optimum amounts seem to be as set forth in Table 3:

TABLE 3

| | Optimum Percentage of Diacetone Alcohol | | |
|---|---|---|---|
| Cure Temp., °C. | 90 | 85 | 80 |
| Comp. of Procedure A | 5 | ≧9 | ≧10 |
| Comp. of Procedure B | 5 | 5 | ≧7 |

Obviously, other modifications and variations of the present invention are possible in the light of the above teachings. It is therefore to be understood that changes may be made in the particular embodiments described above which are within the full intended scope of the invention as defined in the appended claims.

I claim:

1. In an aqueous coating composition comprising a dispersion of colloidal silica in an aliphatic alcohol-water solution of the partial condensate of a silanol of the formula RSi(OH)$_3$, wherein R is selected from the group consisting of alkyl having from 1 to 3 carbon atoms and aryl, at least 70 weight percent of the silanol being CH$_3$Si(OH)$_3$, said composition containing 10 to 50 weight percent solids, said solids consisting essentially of 10 to 70 weight percent colloidal silica and 30 to 90 weight percent of the partial condensate, the improvement comprising the intimate admixture of a small adhesion-promoting amount of a β-hydroxyketone compound with an aged such composition.

2. A composition as defined in claim 1 wherein the composition is aged prior to admixture for at least 5 days at a temperature of at least about 18° C.

3. An aqueous coating as defined in claim 1 wherein said composition has a pH of from 7.1 to about 7.8, further contains a buffered latent silanol condensation catalyst, and the β-hydroxyketone compound has the structural formula:

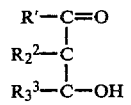

wherein R$^1$ is a monovalent hydrocarbon radical of from 1 to 18 carbon atoms and R$^2$ and R$^3$ are, independently, a monovalent hydrocarbon radical of from 1 to 18 carbon atoms or hydrogen.

4. An aqueous coating composition as defined in claim 3 wherein R$^1$ and R$^3$ are each methyl and R$^2$ are each hydrogen.

5. An aqueous coating composition as defined in claim 3 wherein the aliphatic alcohol is a mixture of methanol and isobutanol.

6. An aqueous coating composition as defined in claim 3 wherein said partial condensate is of CH$_3$Si(OH)$_3$.

7. An aqueous coating composition as defined in claim 3 further containing from about 0.05 to about 0.5 weight percent of a buffered latent silanol condensation catalyst.

8. An aqueous coating composition as defined in claim 7 wherein said catalyst is sodium acetate.

9. An aqueous coating composition as defined in claim 7 wherein said catalyst is potassium acetate.

10. An aqueous coating composition as defined in claim 3 wherein the pH is from about 7.2 to about 7.8.

11. An aqueous coating composition as defined in claim 3 wherein the composition contains from about 18 to about 25 weight percent solids consisting essentially of 25–45 weight percent colloidal silica and 55–75 weight percent of the partial condensate.

12. An aqueous coating composition as defined in claim 3 which also includes a small amount of a polysiloxane polyether copolymer.

13. An aqueous coating composition as defined in claim 3 wherein the composition contains about 20% solids, the partial condensate is of CH$_3$Si(OH)$_3$, the aliphatic alcohol is a mixture of methanol and isobutanol and said β-hydroxyketone compound is present in an amount of about 5–10% by weight of the composition.

14. A solid substrate having at least one surface primed with a thermoplastic acrylic and thereafter coated with the aqueous coating composition of claim 3.

15. An article as defined in claim 14 wherein the solid substrate is comprised of a synthetic organic polymer.

16. An article as defined in claim 15 wherein the polymeric substrate is transparent.

17. An article as defined in claim 15 wherein said polymer is a polycarbonate.

18. An article as defined in claim 17 wherein said polycarbonate is transparent.

19. An article as defined in claim 17 wherein said polycarbonate is a transparent poly(bisphenol-A carbonate).

20. An article as defined in claim 14 wherein the aqueous coating composition has been cured on said surface of said solid substrate.

21. An aqueous coating composition as defined in claim 1 wherein said $\beta$-hydroxyketone compound is present in an amount of from about 2.5 to about 15% by weight of the composition.

22. A solid substrate having at least one surface primed with a thermoplastic acrylic and thereafter coated with the aqueous coating composition of claim 1.

23. An article as defined in claim 22 wherein the aqueous coating composition has been cured on said surface of said solid substrate.

* * * * *

UNITED STATES PATENT AND TRADEMARK OFFICE
CERTIFICATE OF CORRECTION

PATENT NO. : 4,311,763

DATED : January 19, 1982

INVENTOR(S) : James T. Conroy

It is certified that error appears in the above—identified patent and that said Letters Patent is hereby corrected as shown below:

In Claim 3, column 10, lines 27-29, change the formula,

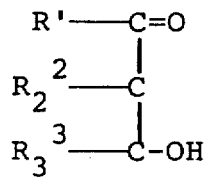

to read

-- 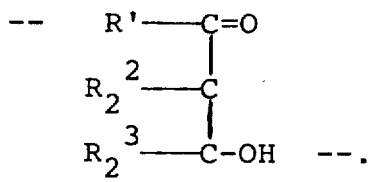 --.

Signed and Sealed this

Seventh Day of September 1982

[SEAL]

Attest:

GERALD J. MOSSINGHOFF

*Attesting Officer*     *Commissioner of Patents and Trademarks*